(12) United States Patent
Duan et al.

(10) Patent No.: US 8,982,522 B2
(45) Date of Patent: Mar. 17, 2015

(54) SELF-ADAPTIVE SURGE-PROOF CIRCUIT

(75) Inventors: Weiyin Duan, Shenzhen (CN); Lixiong Liu, Shenzhen (CN)

(73) Assignee: Shenzhen Huntkey Electric Co., Ltd., Shenzhen (CN)

( * ) Notice: Subject to any disclaimer, the term of this patent is extended or adjusted under 35 U.S.C. 154(b) by 452 days.

(21) Appl. No.: 13/512,023

(22) PCT Filed: Oct. 17, 2011

(86) PCT No.: PCT/CN2011/080855
§ 371 (c)(1),
(2), (4) Date: May 25, 2012

(87) PCT Pub. No.: WO2012/100564
PCT Pub. Date: Aug. 2, 2012

(65) Prior Publication Data
US 2012/0281327 A1    Nov. 8, 2012

(30) Foreign Application Priority Data
Jan. 30, 2011    (CN) .......................... 2011 1 0033548

(51) Int. Cl.
*H02H 1/04*    (2006.01)
*H02H 9/02*    (2006.01)
*H02H 9/04*    (2006.01)
*H02H 3/087*    (2006.01)

(52) U.S. Cl.
CPC . *H02H 1/04* (2013.01); *H02H 9/02* (2013.01); *H02H 3/087* (2013.01); *H02H 9/041* (2013.01)
USPC ........................................................ 361/93.7

(58) Field of Classification Search
CPC ......... H02H 9/02; H02H 9/041; H02H 3/087; H02H 1/04
See application file for complete search history.

(56) References Cited

U.S. PATENT DOCUMENTS 4,940,980 A * 7/1990 Tice ............................. 341/159
5,698,973 A * 12/1997 Goerke et al. ................ 323/238

(Continued)

FOREIGN PATENT DOCUMENTS

| CN | 201365201   | 12/2009 |
|----|-------------|---------|
| CN | 201365201 Y | 12/2009 |
| JP | 2-246778    | 10/1990 |
| JP | 2-246778 A  | 10/1990 |

OTHER PUBLICATIONS

Horowitz et al. The Art of Electronics, 1989, Cambridge University Press, pp. 238.*

(Continued)

*Primary Examiner* — Zeev V Kitov

(57) ABSTRACT

A self-adaptive surge-proof circuit is used in a switching power supply device. The switching power supply device includes an AC input, a filter-rectifier circuit connected to the AC input, and a power converter circuit connected to the filter-rectifier circuit. The self-adaptive surge-proof circuit includes a surge suppression unit connected between the filter-rectifier circuit and the power converter circuit, a switching unit connected in parallel with the surge suppression unit for adjusting an input impedance of the switching power supply device, a sampling unit connected to the filter-rectifier circuit for collecting a surge signal from the filter-rectifier circuit, and a drive-controlling circuit connected to the sampling unit for generating a driving signal for controlling on and off of the switching unit according to the surge signal.

8 Claims, 2 Drawing Sheets

(56) References Cited

U.S. PATENT DOCUMENTS

| | | | |
|---|---|---|---|
| 6,445,165 B1 * | 9/2002 | Malik et al. | 323/222 |
| 7,538,997 B2 * | 5/2009 | Mallikararjunaswamy | 361/56 |
| 2005/0212051 A1 * | 9/2005 | Jozwiak et al. | 257/355 |

OTHER PUBLICATIONS

TVS/Zener Theory and Design Considerations, Handbook, Jun. 2005, SCILLC, ON Semiconductor, pp. 68, 73.*

International Search Report of PCT/CN2011/080855.

* cited by examiner

SELF-ADAPTIVE SURGE-PROOF CIRCUIT

BACKGROUND

1. Technical Field

The present disclosure relates to a self-adaptive surge-proof circuit (SASPC) of inrush-current at start and lightning-surge at operation of a power supply.

2. Description of Related Art

With the rapid development of power supply technologies, switching power supplies have become small and efficient compared to traditional linear power supplies and thus are widely used. Particularly, the switching power supplies have taken place of the linear power supplies to play important roles in fields including but not limited to computers, telecommunications, industrial controls, instruments and apparatuses, and medical equipments.

In practical applications of the power supplies in the fields of telecommunications and industrial controls, the power supplies are often used in terrible environments, which bring forward more strict requirements on the performance of the power supplies. For example, the power supply operation temperature may be from minus 40 degree C. to 50 or even 75 degree C. Moreover, an inrush-current, at start time, and a lightning-surge at operation time may damage components in the circuit or even ruin the power supply. Therefore, a negative temperature coefficient (NTC) resistor is designed in the circuit to prevent the inrush current, and a metal oxide varistor is designed as a lightning-arrestor to prevent the lightning-surge coming from the power grid.

Generally, the inrush-current suppressor includes the NTC resistor, or a silicon controlled rectifier (SCR) connected in parallel with a resistor, or a relay connected in parallel with a power resistor. The thermistor used in the inrush-current suppressor can increase an input impedance of the power supply, thereby limiting the inrush-current in the condition of cold start. However, with the thermistor, the efficiency of the power supply is reduced, which results in a power-on inrush-current in the condition of hot start. With the SCR and the resistor connected in parallel, a high-low temperature may less impact the performance of the power supply. However, as for high-power converter, a driving winding is required, which increases the power dissipation of power supplies. As for the inrush-current suppressor that includes the NTC resistor or power resistor and the relay connected in parallel, although the inrush-current can be limited, the damage caused by the lightening-surge and an overvoltage cannot be avoided as the input impedance is much less than MOV impedance when the relay is in operation. Therefore, there is room for improvement in the art.

SUMMARY

One object of the present disclosure is to provide a self-adaptive surge-proof circuit (SASPC) which can be used in a switching power supply device to avoid an inrush-current at start and a lightning-surge at operation, while keeping an efficiency of the switching power supply unreduced. The switching power supply device includes an AC input, a filter-rectifier circuit connected to the AC input, and a power converter circuit connected to the filter-rectifier circuit. The SASPC includes a surge suppression unit connected between the filter-rectifier circuit and the power converter circuit, a switching unit connected in parallel with the surge suppression unit for adjusting an input impedance of the switching power supply device, a sampling unit connected to the filter-rectifier circuit for detecting the surge signal from the filter-rectifier circuit, and a drive-controlling circuit with an input thereof connected to the sampling unit and with an output thereof connected to the switching unit, for generating a driving signal to control on and off of the switching unit according to the surge signal.

Preferably, the sampling unit includes a sampling resistor, the switching unit is a MOSFET or a relay, and the Rds of the MOSFET or the conduction resistance of the relay is used as the sampling resistor. The sampling resistor is connected to the filter-rectifier circuit for detecting the surge signal.

Preferably, the sampling unit further includes a voltage reference, a voltage-dividing sub-circuit and an isolating sub-circuit connected to the voltage reference in series. The voltage reference is connected to the sampling resistor through resistors of the voltage-dividing sub-circuit for converting the surge signal detected by the sampling resistor into a level-shifted signal, and the level-shifted signal is a voltage signal with a value thereof changing from zero to that of the voltage from the voltage reference.

Preferably, the drive-controlling unit includes a controlling sub-circuit and a driving sub-circuit. The controlling sub-circuit includes a reference power supply and a comparator, inputs of the comparators are respectively connected to the reference power supply and the isolating sub-circuit and is used for comparing the surge signal with a reference signal from the reference power supply to generate a control signal, the control signal controls the driving sub-circuit to generate the driving signal. The driving sub-circuit includes a driving power supply, the first transistor, and the second transistor, the base of the second transistor is connected to an output of the comparator, the emitter thereof is grounded, and the collector thereof is connected to the base of the first transistor; the emitter of the first transistor is connected to the driving power supply, and the collector thereof is connected to the switching unit.

Preferably, the control circuit further includes an emitter follower, and the emitter follower is connected between the isolating sub-circuit and the comparator.

Preferably, the switching unit is a field effect transistor or a relay.

Preferably, the switching unit is a field effect transistor, and the control circuit further includes a driving protection unit connected between the drive-controlling unit and the switching unit. The driving protection unit is further connected to the filter-rectifier circuit for self-adaptively adjusting the driving signal outputted from the driving sub-circuit according to the voltage-drop on the sampling resistor and for clamping the gate voltage of the switch in a safe range while the transient voltage is coming from the filter-rectifier circuit.

Preferably, the driving protection unit includes a third transistor and a TVS diode, the base of the third transistor is connected to the drive-controlling unit, the collector thereof is connected to the filter-rectifier circuit, and the emitter thereof is connected through a diode to the drive-controlling unit and the emitter is also connected to the switching unit; and the TVS diode is connected to the emitter and the collector of the third transistor.

The SASPC of the present disclosure can be used in the switching power supply device. By detecting the voltage-drop on the sampling resistor at the port GND_1, the SASPC self-adaptively adjusts the input impedance of the switching power supply device according to the input current that detected by the sampling resistor. Therefore, when a surge is coming, the switching unit will be turned off, and the surge suppression unit (a power resistor, or NTC resistor) will be put into operation. Then the input impedance of the power converter becomes larger and forces the surge current to go through the MOV or another way back. When the surge is passed away, the switching unit will be turned on, and the surge suppression unit will be bypassed. The input impedance of the power supply is getting low and the normal working current is going through the switching unit efficiently.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 1:
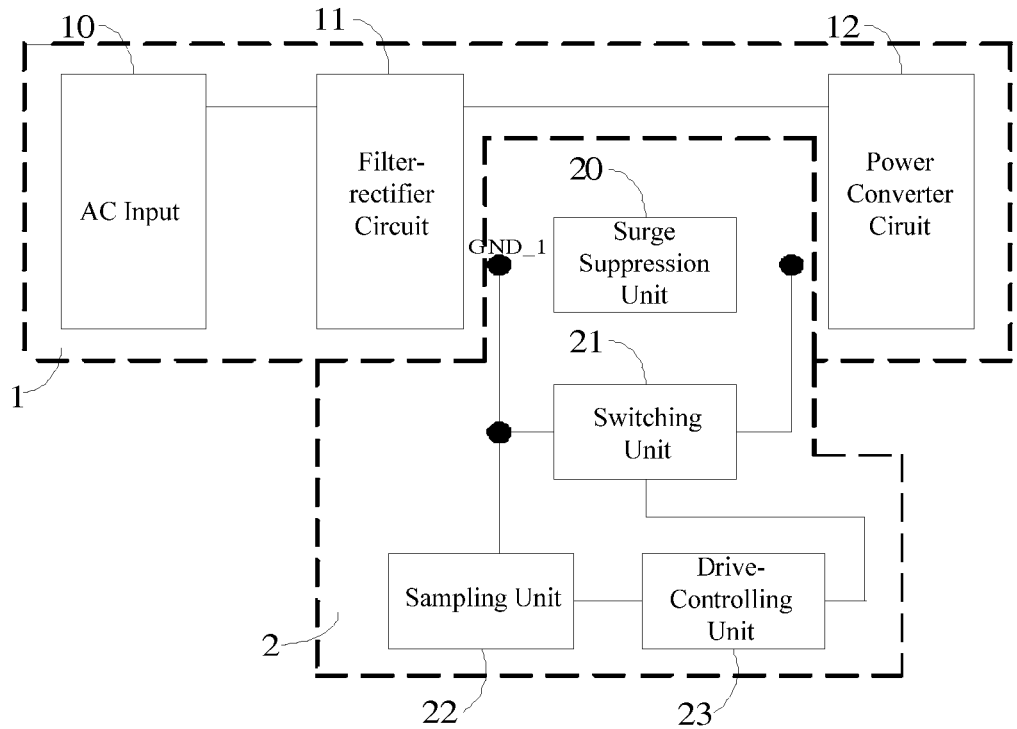
FIG. 1 is a schematic view of a self-adaptive surge-proof circuit in accordance with an embodiment of the present disclosure, and the self-adaptive surge-proof circuit includes a sampling unit and a drive-controlling unit.

Referring to FIG. 1, in one embodiment, a self-adaptive surge-proof circuit 2 is used in a switching power supply device 1. The switching power supply device 1 includes an AC input 10, a filter-rectifier circuit 11 connected to the AC input 10, a power converter circuit 12 connected to the filter-rectifier circuit 11. In other embodiments, the self-adaptive surge-proof circuit 2 may be used in other power supply devices such as flyback converters and power factor correction circuits.

The self-adaptive surge-proof circuit 2 includes a surge suppression unit 20, a switching unit 21, a sampling unit 22, and a drive-controlling unit 23. The surge suppression unit 20 is connected between the filter-rectifier circuit 11 and the power converter circuit 12. The switching unit 21 is connected in parallel with the surge suppression unit 20 and is configured for adjusting an input impedance of the switching power supply device 1. The sampling unit 22 is connected to the filter-rectifier circuit 11 for detecting a surge signal from the filter-rectifier circuit 11. An input of the drive-controlling unit 23 is connected to the sampling unit 22 and an output thereof is connected to the switching unit 21, and is configured for generating a driving signal according to the surge signal detected by the sampling unit 22. The driving signal is in control of on and off of the switching unit 21. In some embodiments, the surge suppression unit 20 may be a resistor and the switching unit 21 may be a metal oxide semiconductor field effect transistor (MOSFET) or a relay. When the switching unit 21 is a relay, the driving signal generated by the drive-controlling unit 23 is common-ground with the power converter circuit 12, and the switching unit 21 is connected to a driving winding of the relay.

The filter-rectifier circuit 11 includes a voltage output port GND_1. The voltage outputted from the port GND_1 is a changing negative voltage and is dropping quickly when a surge current is coming The sampling unit 22 at this time is capable of detecting the surge signal from the filter-rectifier circuit 11 and outputting the detected surge signal to the drive-controlling unit 23. The drive-controlling unit 23 receives the surge signal and turns off the switching unit 21 accordingly. After the switching unit 21 is turned off, the surge suppression unit 20 is connected into the input circuit of the switching power supply device 1 and thus increases the input impedance of the switching power supply device 1 to suppress the surge current. After the surge current is suppressed and reduced to a normal value, the voltage outputted from the port GND_1 of the filter-rectifier circuit 11 increases accordingly. At this time, the sampling unit 22 is capable of detecting the surge signal and outputting the detected surge signal to the drive-controlling unit 23. The drive-controlling unit 23 receives the surge passed signal and turns on the switching unit 21. After the switching unit 21 is turned on, the surge suppression unit 20 is no longer connected to the input circuit of the switching power supply device 1, which reduces the input impedance of the switching power supply device 1 and thus improves the converting efficiency of the switching power supply device 1.

Figure 2:
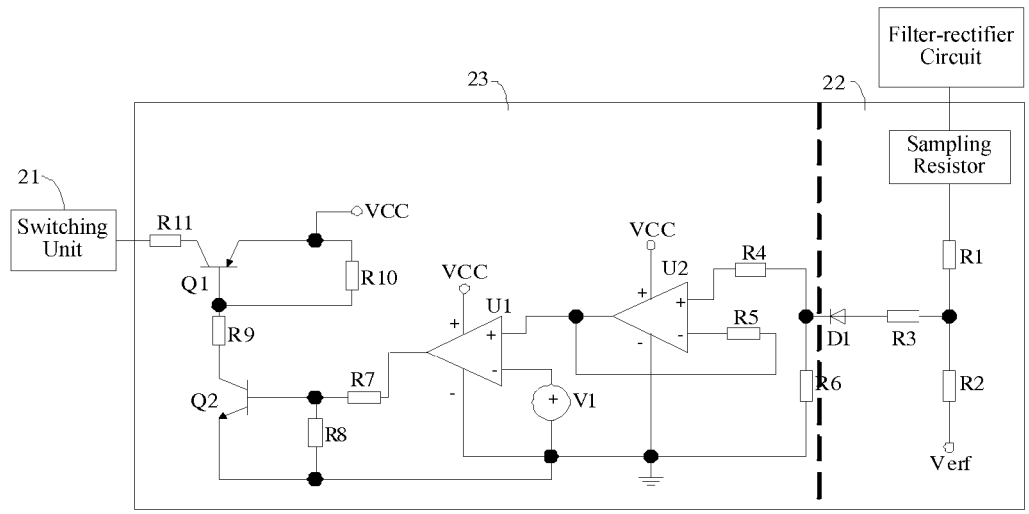
FIG. 2 is a circuit diagram of the sampling unit and the drive-controlling unit of the self-adaptive surge-proof circuit of FIG. 1.

Referring to FIG. 2, the sampling unit 22 in the embodiment includes a sampling resistor, the first dividing resistor R1, the second dividing resistor R2, the third dividing resistor R3, the forth dividing resistor R6, a voltage reference Verf, and the first diode D1.

The sampling resistor is connected to the port GND_1 of the filter-rectifier circuit 11 for detecting the surge signal outputted therefrom. When the switching unit 21 is a MOSFET or a relay, the Rds of the MOSFET or the conduction resistance of the relay of the switching unit 21 can be used as the sampling resistor, that is, the sampling resistor may be embedded in the switching unit 21. The first and second dividing resistors R1, R2 are connected in series between the sampling resistor and the voltage reference Verf. In this way, the first and second dividing resistors R1, R2 forms the first dividing sub-circuit for dividing the voltage generated between the port GND_1 and the voltage reference Verf. One end of the third dividing resistor R3 is connected between the first and second dividing resistors R1, R2, and the other end thereof is connected to an anode of the first diode D1. One end of the forth dividing resistor R6 is connected to the cathode of the first diode D1, and the other end thereof is grounded. The first diode D1 forms an isolating sub-circuit. The third and forth dividing resistors R3, R6 forms the second dividing sub-circuit for further dividing the voltage generated between the port GND_1 and the voltage reference Verf. The voltage outputted from the reference Verf is a constant positive voltage.

On one hand, while the surge current is coming, the voltage outputted from the port GND_1 becomes far below the ground and the voltage reference Verf is a constant positive voltage. Since the voltage from the voltage reference Verf is a constant positive voltage and the voltage from the port GND_1 is a negative voltage, therefore, the voltage at the anode of the first diode D1 may be a negative voltage after being divided by the third dividing resistor R3 at this time. The first diode D1 thus is turned off. On the other hand, after the surge current is suppressed, the voltage outputted from the port GND_1 returns to its normal level, which is below and close to the ground, and shifts the voltage at the anode of the first diode D1 to a positive level after the third dividing resistor R3. Thus, the first diode D1 is turned on. With the voltage reference Verf, the surge signal is converted to be level-shifted signals, which allows the level of the voltage applied to the first diode D1 to change from zero to the voltage outputted from the voltage reference Verf. Thus, the voltage inputted to the comparator U1 can be higher than zero.

The drive-controlling unit 23 includes a controlling sub-circuit and a driving sub-circuit. The controlling sub-circuit includes a reference power supply V1 and a comparator U1. The reference power supply V1 is used for supplying a reference signal that is set in line with the over current threshold. One input of the comparator U1 is connected to the reference power supply V1, and the other input thereof is connected to the first and second dividing resistors R1, R2. In this way, the comparator U1 is capable of comparing the surge signal detected by the sampling resistor with the reference signal from the reference power supply V1 and further outputting a control signal to the driving sub-circuit. The driving sub-circuit thus generates the driving signal under the control of the control signal.

The driving sub-circuit includes a driving power supply VCC, the first transistor Q1, the second transistor Q2, the first driving resistor R7, the second driving resistor R8, the third driving resistor R9, the forth driving resistor R10, and the fifth driving resistor R11. The first transistor Q1 is a PNP type transistor and the second transistor Q2 is NPN type transistor. The base of the second transistor Q2 is connected to the output of the comparator U1 via the first driving resistor R7, the emitter thereof is grounded, and the collector thereof is connected to the base of the first transistor Q1 via the third driving resistor R9. One end of the second driving resistor R8 is connected to the base of the second transistor Q2 and the first driving resistor R7, and the other end thereof is grounded. The emitter of the first transistor Q1 is connected to the driving power supply VCC, and the collector thereof is connected to the switching unit 21 via the fifth driving resistor R11. One end of the forth driving resistor R10 is connected to the emitter of the second transistor Q2 and the driving power supply VCC, and the other end thereof is connected to the base of the second transistor Q2 and the third driving resistor R9.

When the voltage outputted from the port GND_1 is lower enough below the ground and leads to the voltage at anode of D1 is lower than the reference power supply V1, the comparator U1 outputs a low-level signal, which turns off the both of the first and the second transistors Q1, Q2. Since the first transistors Q1 is turned off, the driving sub-circuit is turning off the switching unit 21. At this time, the surge suppression unit 20 is connected in the input circuit of the switching power supply device 1. When the voltage outputted from the port GND_1 is getting higher and stable close to the ground, and leads to the voltage at anode of the D1 is higher than the reference voltage V1, the comparator U1 outputs a high-level signal, which turns on the first and the second transistors Q1, Q2. Therefore, the driving sub-circuit is turning on the switching unit 21. After the switching unit 21 is turned on, the surge suppression unit 20 is bypassed and the current is going through the low-impedance switching unit 21 to the input circuit of the switching power supply device 1.

The drive-controlling unit 23 further includes an emitter follower U2, an input resistor R4, and R5. The non-inverting input of the emitter follower U2 is connected to the cathode of the first diode D1 via the input resistor R4, and the inverting input thereof is connected to the output via the resistor R5. The output of the emitter follower U2 is further connected to one input of the comparator U1.

Figure 3:
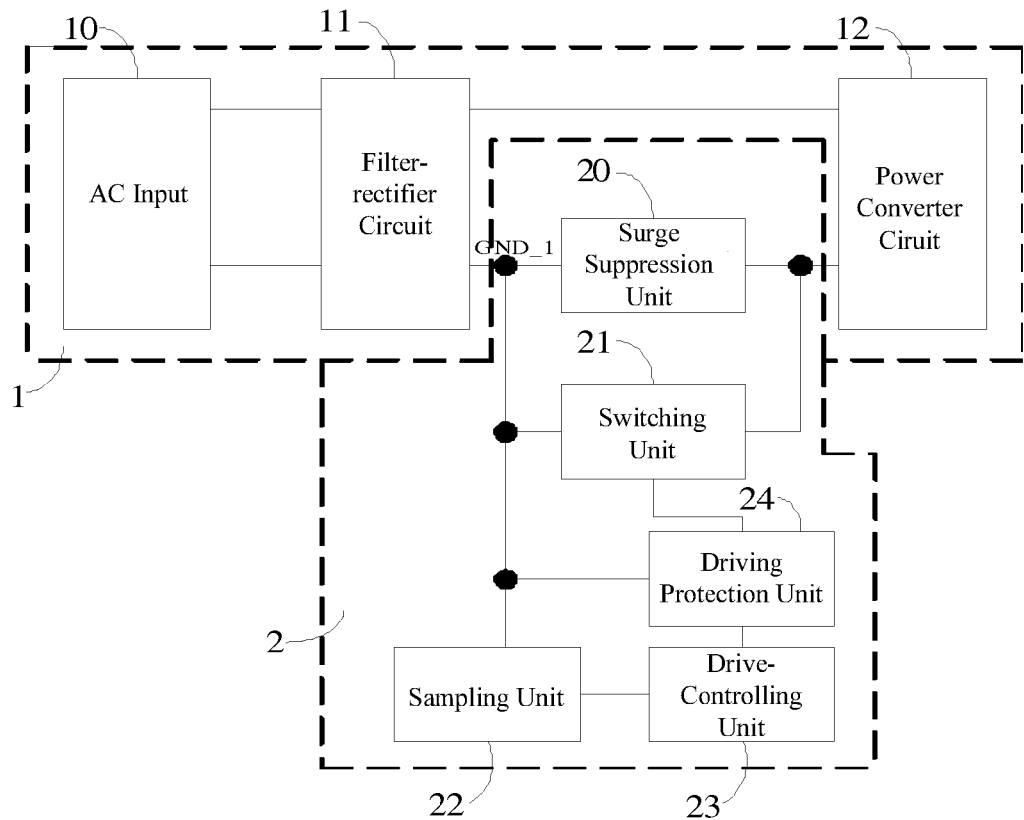
FIG. 3 is a schematic view of a self-adaptive surge-proof circuit in accordance with another embodiment of the present disclosure, and the self-adaptive surge-proof circuit includes a driving protection unit.

Referring to FIG. 3, in a second embodiment, the switching unit 21 is a MOSFET transistor, and the control circuit 2 further includes a driving protection unit 24. The driving protection unit 24 is connected to the drive-controlling unit 23 and the filter-rectifier circuit 11, and is configured for adjusting the driving signal generated by the drive-controlling unit 23.

Figure 4:
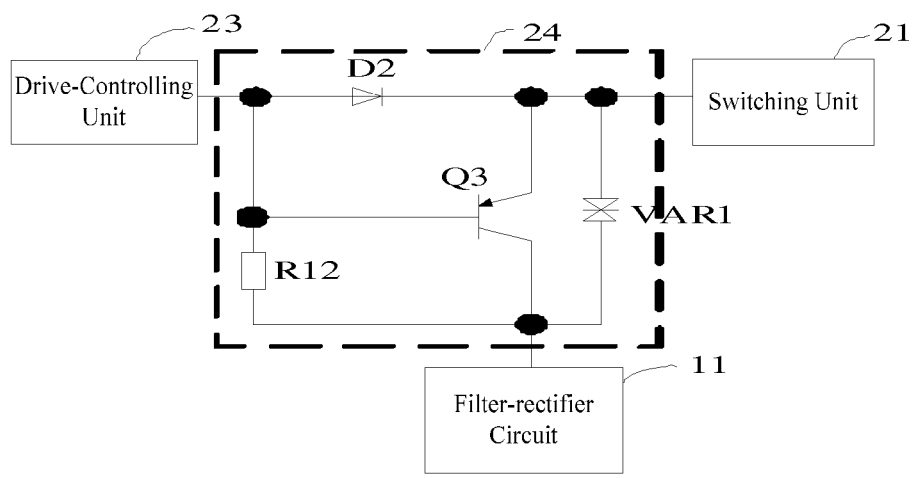
FIG. 4 is a circuit diagram of the driving protection unit of the self-adaptive surge-proof circuit of FIG. 3.

Referring to FIG. 4, the driving protection unit 24 includes the third transistor Q3, the second diode D2, a TVS diode VAR1, and the sixth driving resistor R12. The third transistor Q3 is a PNP type transistor. The base of the third transistor Q3 is connected to the drive-controlling unit 23, the collector thereof is connected to the filter-rectifier circuit 11, and the emitter thereof is connected to the cathode of the second diode D2. The anode of the second diode D2 is connected to the drive-controlling unit 23 and the base of the third transistor Q3. Two ends of the TVS diode VAR1 are respectively connected to the collector and the emitter of the third transistor Q3. Two ends of the sixth driving resistor R12 are respectively connected to the base and the collector of the third transistor Q3.

When the transient voltage is coming from the port GND_1, the TVS diode VAR1 is clamping the voltage level of the driving signal generated by the drive-controlling circuit 23 in a predetermined range. With the third transistor Q3, the driving signal generated from the drive-controlling unit 23 is capable of turning off the switching unit 21 more quickly.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A self-adaptive surge-proof circuit, being used in a switching power supply device, the switching power supply device comprising an AC input, a filter-rectifier circuit connected to the AC input, and a power converter circuit connected to the filter-rectifier circuit; the self-adaptive surge-proof circuit comprising:
    a surge suppression unit connected between the filter-rectifier circuit and the power converter circuit;
    a switching unit connected in parallel with the surge suppression unit, being configured for adjusting an input impedance of the switching power supply device;
    a sampling unit connected to the filter-rectifier circuit; and
    a drive-controlling unit with an input thereof connected to the sampling unit and with an output thereof connected to the switching unit, being configured for generating a driving signal for controlling on and off of the switching unit according to the surge signal;
    wherein the sampling unit and the switching unit obtain a surge signal outputted from the filter rectifier circuit, the switching unit provides a sampling resistor connected to the filter-rectifier circuit for detecting the surge signal.

2. The self-adaptive surge-proof circuit as claimed in claim 1, wherein the switching unit is a metal oxide semiconductor field effect transistor or a relay, the Rds of the metal oxide semiconductor field effect transistor or the conduction resistance of the relay is used as the sampling resistor.

3. The self-adaptive surge-proof circuit as claimed in claim 2, wherein the sampling unit further comprises a voltage reference, a voltage-dividing sub-circuit and an isolating sub-circuit connected to the voltage reference in series; the voltage reference is connected to the sampling resistor through the resistors of the voltage-dividing sub-circuit for converting the surge signal detected by the sampling resistor into a level-shifted signal, the level-shifted signal is a voltage signal having a value ranging from zero to that of the voltage reference.

4. The self-adaptive surge-proof circuit as claimed in claim 3, wherein the drive-controlling unit comprises a controlling sub-circuit and a driving sub-circuit, the controlling sub-circuit comprises a reference power supply and a comparator, inputs of the comparators are respectively connected to the reference power supply and the isolating sub-circuit and is used for comparing the surge signal with a reference signal from the reference power supply to generate a control signal, the control signal controls the driving sub-circuit to generate the driving signal; the driving sub-circuit comprises a driving power supply, the first transistor, and the second transistor, the base of the second transistor is connected to an output of the comparator, the emitter thereof is grounded, and the collector thereof is connected to the base of the first transistor; the emitter of the first transistor is connected to the driving power supply, and the collector thereof is connected to the switching unit.

5. The self-adaptive surge-proof circuit as claimed in claim 4, wherein the control circuit further comprises an emitter follower, and the emitter follower is connected between the isolating sub-circuit and the comparator.

6. The self-adaptive surge-proof circuit as claimed in claim 1, wherein the switching unit is a field effect transistor, or a relay.

7. The self-adaptive surge-proof circuit as claimed in claim 6, wherein the switching unit is a metal oxide semiconductor field effect transistor, and the control circuit further comprises a driving protection unit connected between the drive-controlling unit and the switching unit, the driving protection unit is further connected to the filter-rectifier circuit for adjusting the driving signal outputted from the driving sub-circuit according to the voltage-drop on the sampling resistor and for clamping the gate voltage of the switch in a safe range while the transient voltage is coming from the filter-rectifier circuit.

8. The self-adaptive surge-proof circuit as claimed in claim 7, wherein the driving protection unit comprises the third transistor and a TVS diode, the base of the third transistor is connected to the drive-controlling unit, the collector thereof is connected to the filter-rectifier circuit, and the emitter thereof is connected through a diode to the drive-controlling unit and the emitter is also connected to the switching unit; and the TVS diode is connected to the emitter and the collector of the third transistor.

* * * * *